R. E. HELLMUND.
SYSTEM OF CONTROL.
APPLICATION FILED OCT. 16, 1918.

1,358,738.

Patented Nov. 16, 1920.
2 SHEETS—SHEET 1.

WITNESSES:
H. J. Shelhamer
W. P. Coley

INVENTOR
Rudolf E. Hellmund
BY
Wesley G. Carr
ATTORNEY

R. E. HELLMUND.
SYSTEM OF CONTROL.
APPLICATION FILED OCT. 16, 1918.
1,358,738.
Patented Nov. 16, 1920.
2 SHEETS—SHEET 2.
Fig. 4.
Fig. 5.
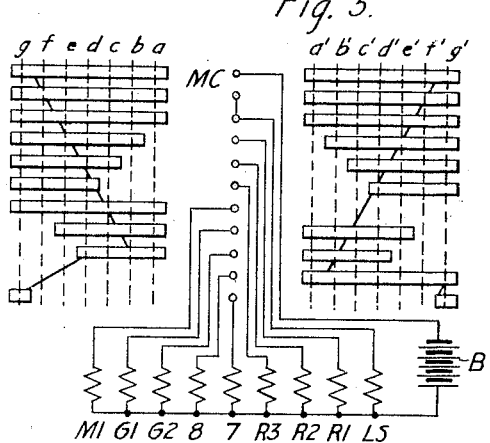
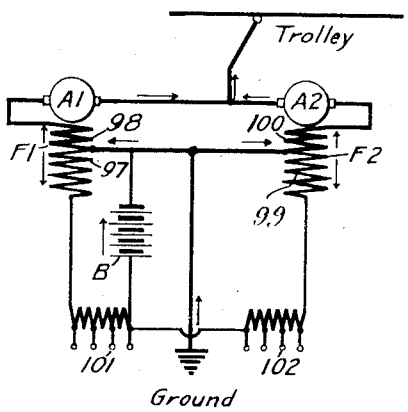
Fig. 6.
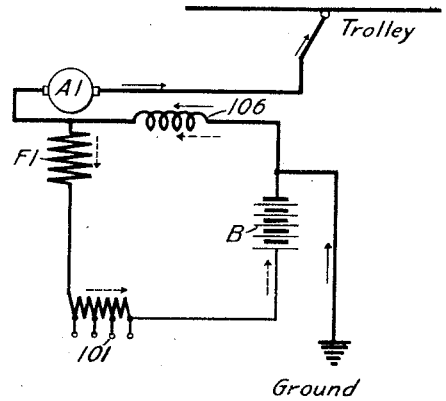
Fig. 7.
WITNESSES:
H. T. Shelhamer
W. P. Coley
INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,358,738.     Specification of Letters Patent.     Patented Nov. 16, 1920.

Original application filed October 24, 1916, Serial No. 127,381. Divided and this application filed October 16, 1918. Serial No. 258,444.

*To all whom it may concern:*

Be it known that I, RUDOLF E. HELLMUND, a citizen of the United States, and a resident of Swissvale, in the county of Allegheny and State of Pennsylvania, have invented a new and useful Improvement in Systems of Control, of which the following is a specification, this application being a division of application Serial No. 127,381, filed October 24, 1916, patented October 28, 1919, No. 1,320,053.

My invention relates to systems of control for dynamo-electric machines, and it has special relation to the regenerative control of electric motors that are adapted for use in propelling electric railway vehicles, and the like.

One object of my invention is to provide simple, durable, and reliable means for effecting regenerative operation of the momentum-driven armatures of motors of the above-indicated character, whereby a certain proportion of the energy absorbed during the propelling period is returned to the supply circuit, to reduce operating expenses, and whereby various other well-known operating advantages are secured.

Another object of my invention is to provide a system of regenerative control which shall embody means for automatically compensating for the unavoidable voltage fluctuations in the supply-circuit voltage, whereby a substantially constant regenerated current is maintained during such fluctuations.

More specifically stated, an object of my invention is to provide a motor-generator set or dynamotor of relatively small capacity for variably energizing the main series field magnet winding of the propelling motor or motors during regenerative operation. The set may be driven in any suitable manner, as from an external source of energy.

Viewed from another angle, it is an object of my invention to provide a regenerative system employing substantially constant main-field winding excitation that is essentially independent of the supply circuit voltage, but is dependent upon the regenerated current for purposes to be set forth.

Figure 1:
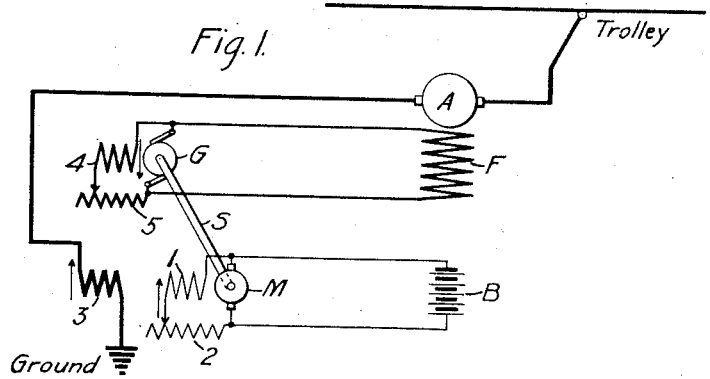
Figure 2:
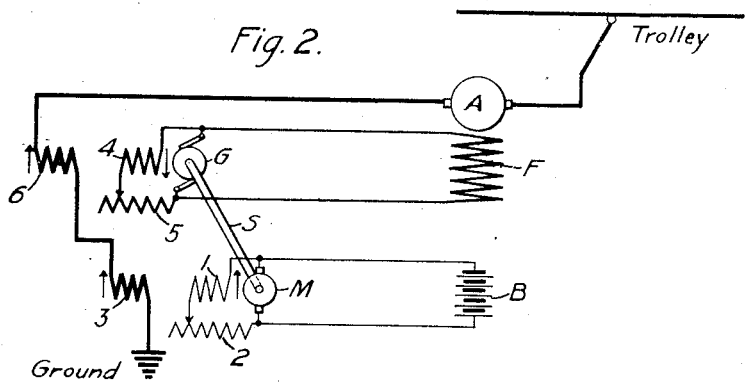
Figure 3:
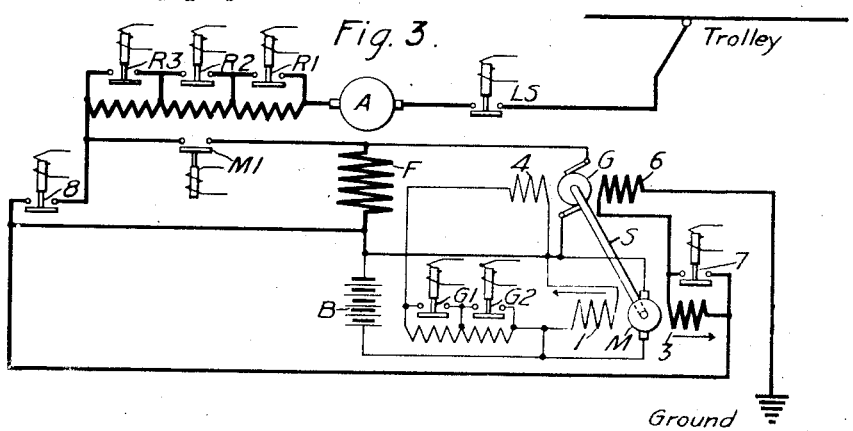

The various novel circuit arrangements and connections employed in my invention may best be understood by reference to the accompanying drawings, in which Figures 1, 2 and 3 are diagrammatic views of the main circuit connections of various control systems embodying my invention; Fig. 4 is a chart, of well-known form, indicating the sequence of operation of the various motor-controlling switches shown in Fig. 3; Fig. 5 is a diagrammatic view of an auxiliary control system for operating the system of Fig. 3 in accordance with the chart, Fig. 4 and Figs. 6 and 7 are diagrammatic views of further modifications of my invention.

Like reference characters designate like parts in all of the figures.

Referring to Fig. 1 of the drawings, the system here shown comprises a supply circuit that includes a supply conductor marked "Trolley" and a return circuit conductor marked "Ground"; a dynamo-electric machine, such as a direct-current railway motor, for example, having an armature A and a series-type field winding F that is preferably connected in series relation with the armature during acceleration, in accordance with a familiar practice; and an auxiliary motor-generator set comprising a motor M that is supplied with propelling energy from a suitable source, such as a battery B, and a generator or exciter G, that is suitably mechanically connected to the motor M, as by a shaft S.

The motor M is provided with a shunt field magnet winding 1, the strength of which may be varied by a suitable resistor 2, and a series-type field winding 3, that is connected in series-circuit relation with the armature A. The generator G has a shunt field winding 4 and a variable resistor 5, and is connected to energize the field winding F of the propelling motor, thereby imparting a compounding characteristic thereto during regeneration. It will be understood that the particular system for accelerating the motor is not material to my present invention, and that any suitable system may be employed.

Assuming the system to be connected as shown and that the armature A is driven by the momentum of the associated vehicle at a speed suitable for regeneration to the supply circuit, the operation of the system, relative to compensation for supply-circuit voltage fluctuations, may be described as follows: If the supply-circuit voltage decreases, the regenerated current will correspondingly increase because of the relatively great difference between the momentary machine voltage and the voltage of the supply circuit. The field flux of the shunt motor M will, consequently, be strengthened through the increased energization of the series field winding 3, thereby decreasing the speed of the motor-generator set, in accordance with well-known principles. The output of the generator G, that is to say, the excitation of the main machine field winding F, is correspondingly decreased, thereby tending to maintain a substantially constant value of regenerated current.

The system shown in Fig. 2 embodies all of the elements of Fig. 1, and, in addition, the generator G is provided with a field magnet winding 6 that is connected in series with the armature A and the series field winding 3, and is suitably differentially-wound with respect to the shunt field winding 4, of the generator G, thus acting in opposition to the field winding 4. In this case, the temporary increase of regenerated current, upon a decrease in supply-circuit voltage, in addition to the slowing-down effect on the motor-generator set, as described in connection with Fig. 1, also serves to decrease the effective field flux of the generator G by reason of the differential action of the series and shunt field windings thereof. The excitation of the series field winding F is thus again decreased, with the desired effect of maintaining a substantially constant regenerated current. Modifications of the system illustrated, by omitting certain of the field windings of the motor-generator set, may be employed in some instances, dependent upon operating conditions.

It should be noted that, in addition to adaptibility for regenerative operation, certain of the modifications of my invention may also be employed for "field control" during acceleration and for preventing "flash-over" conditions in the motors upon the resumption of supply-circuit voltage after a temporary interruption thereof. Fig. 1, for instance, shows a system that is adaptable for all three purposes. The action of the series field winding 3 of the small motor during voltage fluctuations that occur in regeneration has already been described. However, if the main motor is used for propelling purposes, the current in the series field winding is reversed, and, therefore, the action of this field winding is in opposition to the action of the motor shunt field winding 1. As a result, the increase of main motor load weakens the field flux of the small motor M, thereby increasing the speed of the motor-generator set and, consequently, increasing the excitation of the series field winding F. In this case, the main motor will have the regular characteristics of a series type of motor. The tendency to "flashing," in case of short current interruptions, will be greatly reduced or eliminated, for the following reason: The inertia or fly-wheel effect of the motor-generator set will maintain rotation above a certain speed for some time, irrespective of the demagnetizing action of the series field winding 3. Moreover, the self-induction of the generator field winding 4 and of the series field winding F, will tend to prevent rapid dying out of the main motor field flux. There will thus be a certain value of main field flux available when supply-circuit current is resumed, thereby preventing the momentary excessive predominance of armature flux over field flux, which condition tends to cause "flash-over." Longer power interruptions may be automatically compensated for by energization of the series field winding F from an external source of energy, for example, as set forth in my application, Serial No. 863,504, filed September 25, 1914, which matured into Patent No. 1,249,954, granted December 11, 1917. "Field control" may be accomplished by varying the battery voltage, or by manipulating either of the shunt field resistors 2 and 5, as will be understood.

In Fig. 3 is shown a system which comprises a supply-circuit conductor marked "Trolley"; a return-circuit conductor marked "Ground"; the main motor armature A; series field magnet winding F; an accelerating resistor, sections of which are adapted to be respectively short-circuited by switches R1, R2 and R3; motor-controlling switches LS, M1 and S; the motor-generator set comprising motor M, with shunt and series field windings 1 and 3, respectively, generator G, with shunt and series field windings 4 and 6, respectively, and battery B that is connected to the terminals of the motor M; a resistor that is disposed in series relation with the shunt field winding 4 across the battery B, the sections of said resistor being adapted for respective short-circuiting by switches G1 and G2; and a switch 7 for short-circuiting the series field winding 3.

In Fig. 5 is shown a familiar type of auxiliary control system for operating the main system of Fig. 3, in accordance with the sequence chart of Fig. 4. A master controller MC, when successively operated through positions $a$ to $g$, inclusive, in one direction from its "off" position, is adapted to accelerate the motor, and when successively operated through positions $a'$ to $g'$, inclusive, in the other direction, is adapted to effect regenerative operation of the motor.

The motor is accelerated by first successively closing the switches R1, R2 and R3, thereby reducing the main-circuit resistance. The switches G2 and G1, which govern the resistor in the shunt field circuit of the generator G, are then successively opened, thereby decreasing the excitation of the series field winding F, and causing a further increase in main motor speed. The final running position comprises the short-circuiting of the series field winding 3, by the closure of the switch 7, thus producing an increased field flux in the motor M, by reason of the differential action of the field windings 1 and 3. The motor-generator set thus decreases in speed, and the current in the series-field winding F is correspondingly decreased, thereby effecting a further increase in speed of the main motor. The series field winding F is so designed and proportioned that, under relatively light-load conditions, that is, when a relatively weak field current obtains, only a portion of the armature current is required to energize the field winding F, the other portion traversing the armature winding of the generator G, thus serving to drive the motor-generator set. In this case, the armature of the motor M generates current and charges the battery. When the main field winding F is operating near its maximum excitation, it requires more current than that corresponding to the motor load. Under this condition, the extra field current is supplied by the armature of the generator G, acting as a generator, while the motor M is driven by the battery as a motor.

During regeneration, as shown in Fig. 5, switch M1 remains permanently open and a new switch 8 is closed in its place, thereby exciting the series field winding F entirely from the generator G. The operating connections are otherwise shown as similar to those utilized in acceleration. However, if desired, the main field winding F may be reversed and retained in series circuit relation with the armature A during regeneration. It will be noted that the system described permits the use of a battery of relatively small capacity, inasmuch as it is charged during a portion of the operation. It also may be chosen of a well suited voltage.

The remaining systems are of a different type from those previously set forth, being, in general, more simple in arrangement by reason of the fact that a battery alone is used in connection with the main-field-winding excitation, whereas, in the preceding systems, both a battery and a motor generator are utilized. In systems wherein the main-field-winding excitation is entirely independent of the trolley voltage, the unavoidable fluctuations of trolley voltage may, at times, produce undesirable effects, particularly in the case of a sudden interruption of supply-circuit voltage, when relatively heavy currents may occur for an instant.

On the other hand, in systems of the class wherein the main-field-winding excitation voltage is dependent upon the supply-circuit voltage, so that such excitation varies with the supply-circuit voltage and thus, the above-mentioned excessive currents can not occur, the system is inherently adapted to produce undesirably high regenerated voltage upon a sudden decrease or interruption of supply-circuit voltage, since the inherent tendency, in many systems, is to maintain a main-field-winding excitation that is sufficient to provide a main armature or regenerated voltage that is higher than the normal supply-circuit voltage by a predetermined amount. Particularly, in systems that employ a motor-generator set or the like that is driven from the regenerated voltage, the cycle of operation is such as to successively increase the regenerated voltage that is supplied to the motor-generator set and thus increase the main-field-winding excitation and, therefore, the main-armature or regenerated voltage. Under such conditions, a dangerously high regenerated voltage is liable to be attained in the course of a second or so, thereby leading to "flash-over" troubles and the like in the main motors or in the driving motor of the auxiliary motor-generator set.

A compromise system which embodies the good features of both of the above-mentioned classes of systems may be obtained by making the main-field-winding excitation normally essentially independent of the supply-circuit voltage, and by preventing excessive regenerated currents, either by making such excitation dependent upon the regenerated current in a suitable manner or by making such excitation only temporarily dependent upon the supply-circuit voltage, until relays or other control devices have been given time to operate and either interrupt the circuit connections or change them to correspond to the new values of supply-circuit voltage. The previously-described systems embody this compromise feature, as do also the following systems, which, as previously mentioned, are in some ways simpler than the systems that were first set forth.

The system shown in Fig. 6 comprises the supply-circuit conductors Trolley and Ground; main dynamo-electric machines comprising armatures A1 and A2 and field windings F1 and F2; and in addition, a battery B for exciting certain portions of the field windings; and a plurality of variable resistors 101 and 102 that are connected in circuit with the respective battery-excited portions of the field windings.

In the present system, the field winding F1 is divided into a larger portion 97 and a smaller continuous portion 98, while the other main field winding F2 is divided into a pair of corresponding sections 99 and 100. The portion 97 of the field winding F1 is connected in circuit with the battery B through the variable resistor 101, and a similar connection of the field winding sections 99 and the variable resistor 102 obtains.

As indicated by the respective arrows, the main armature or regenerated current traverses the smaller field-winding sections 98 and 100 in the same direction as it traverses the main armatures A1 and A2, whereas the auxiliary current that is supplied by the battery B flows through the larger field-winding portions 97 and 99 differentially with respect to the main current in the smaller field-winding sections 98 and 100.

Thus, the desired negative compounding effect is obtained in the system under consideration for the following reasons: the normal excitation that is supplied by the main field winding F1, for example, is the resultant flux that is produced by the differentially-related sections 97 and 98. In case of an incipient increase of main-armature or regenerated current, the effect of the smaller field-winding sections 98 will be increased to correspondingly reduce the total effective field-winding flux, and thus, the regenerated current is inherently reduced to the desired normal value. The converse action, of course, takes place in case of an incipient decrease of regenerated current.

To compensate for the gradual decrease of vehicle speed during the regenerative period, the field-winding-circuit resistors 101 and 102 may be gradually excluded from circuit in any suitable manner to thereby correspondingly increase the effective main-field-winding excitation.

Fig. 7 discloses a system comprising the main dynamo-electric machine and the battery B, as previously described and, in addition, an inductive device 106 is connected in series relation with the armature A1 across the supply circuit, while the battery B is connected across the field winding F1 through the inductive device 106 and also a variable resistor 101, which may be employed for the purpose of compensating for the gradual decrease of vehicle speed during the retardation period.

As indicated by the solid and the dotted arrows, respectively, the main-armature or regenerated current and the main-field-winding or excitation current traverse the inductive device 106 in the same direction. Consequently, upon an incipient increase of regenerated current, the voltage drop across the device 106 is immediately and inherently increased to a corresponding degree, whereby the voltage available for delivery to the allied main field winding F1 from the battery B is accordingly reduced, to decrease the current flow through the main field winding F1 and thus effect a reduction of the main-armature current to the desired normal value. The converse action automatically takes place in the case of an incipient decrease of regenerated current in the main armature, as will be understood. Consequently, what may be termed a "negative compounding effect" is automatically and inherently provided in the system, and a relatively stable regenerative control system is thus obtained. The temporary effect of the inductive device 106 is greater than that which would be obtained from a resistor, by reason of the well-known inductive "kick" that occurs upon sudden changes of current conditions.

The system just described thus functions to impress a substantially constant voltage from the battery B upon the field-winding circuit irrespective of supply-circuit voltage fluctuations, but the field excitation is temporarily influenced by changes in the regenerated current that traverses the inductive device 106.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of regenerative control, the combination with a supply circuit and a main dynamo-electric machine having an armature and a field winding, of an independent source of energy, an auxiliary generating machine for exciting the main field winding and having a field winding energized independently of supply-circuit voltage variations, an auxiliary motor for driving said generating machine and receiving energy from said source, and means for varying the effective main field-excitation in the opposing direction to changes of regenerated current.

2. In a system of control, the combination with a supply-circuit, and a momentum-driven armature of a dynamo-electric machine having a field-magnet winding, of an auxiliary motor-generator set connected to energize said field winding during regeneration, means completely independent of said supply circuit for driving said set, and a field-magnet winding connected in the regenerative circuit and disposed to aid in exciting the motor of said set for automatically maintaining a substantially constant regenerated current as the supply-circuit voltage fluctuates.

3. In a system of control, the combination with a supply circuit, and a momentum-driven armature of a dynamo-electric machine having a series field-magnet winding, of an auxiliary motor-generator set connected to energize said field winding during regeneration, means completely independent of said supply circuit for driving said set, and a field-magnet winding connected in the regenerative circuit for partially exciting the motor of said set to vary the output thereof directly with the variation of supply-circuit voltage to automatically maintain a substantially constant regenerated current.

4. In a system of control, the combination with a supply-circuit, and a momentum-driven armature of a dynamo-electric machine having a field-magnet winding, of an independent source of energy, an auxiliary motor-generator set connected to energize said field winding during regeneration and provided with a field-magnet winding energized from said source and an oppositely-acting field-magnet winding connected to said supply circuit.

5. In a system of control, the combination with a supply-circuit, and momentum-driven armature of a dynamo-electric machine having a field-magnet winding, of an independent source of energy, and an auxiliary motor-generator set having its armatures respectively driven from said source and connected to energize said field winding during regeneration and having a shunt field winding connected across one of said auxiliary armatures and an oppositely-acting field winding energized in accordance with the regenerated current.

6. In a system of control, the combination with a supply-circuit, and a momentum-driven dynamo-electric machine having a field-magnet winding, of an auxiliary generating dynamo-electric machine, a driving motor therefor having a field-magnet winding connected in circuit with said first field winding, and means for energizing said first field winding from said auxiliary machine to effect regeneration of said first machine to said supply circuit.

7. In a system of control, the combination with a supply-circuit, and a momentum-driven armature of a main dynamo-electric machine having a field-magnet winding, of an auxiliary generating armature having a field winding energized independently of supply-circuit-voltage fluctuations and adapted to energize said field winding to effect regeneration of said main machine to said supply circuit, a driving motor for said auxiliary armature, and a source, other than the supply circuit, for energizing said motor, whereby a voltage rise of said auxiliary armature upon an interruption of supply-circuit voltage is inherently prevented.

8. In a system of control, the combination with a supply-circuit, and a momentum-driven armature of a main dynamo-electric machine having a field-magnet winding, of an auxiliary generating armature having a field winding energized independently of supply-circuit-voltage fluctuations and adapted to energize said field winding to effect regeneration of said main machine to said supply circuit, a driving motor for said auxiliary armature, and a storage battery for energizing said motor, whereby the speed and voltage conditions of the auxiliary machines remain substantially unchanged upon an interruption of supply-circuit voltage.

9. In a system of control, the combination with a supply-circuit, and a momentum-driven armature of a main dynamo-electric machine having a field-magnet winding, of an auxiliary generating armature having a field winding energized independently of supply-circuit-voltage fluctuations and adapted to energize said field winding to effect regeneration of said main machine to said supply circuit, a driving armature for said generating armature, and means for separately influencing the auxiliary armature voltages in accordance with the regenerated current.

10. In a system of control, the combination with a supply-circuit, and a momentum-driven armature of a main dynamo-electric machine having an armature and a field-magnet winding, of an auxiliary generator circuit adapted to inherently vary the main field-winding current oppositely to changes of main-armature current, a driving motor for the auxiliary generator having a field winding connected in the regenerative circuit to effect changes of auxiliary-machine speed to modify such inherent variations, and means completely independent of said supply circuit for driving said motor.

11. In a system of control, the combination with a supply-circuit, and a momentum-driven armature of a main dynamo-electric machine having a field-magnet winding, of an auxiliary generating armature adapted to energize said field winding to effect regeneration of said main machine to said supply circuit, a driving armature for said generating armature, and separate field windings for said auxiliary armatures energized in accordance with the regenerated current.

12. In a system of control, the combination with a supply-circuit, and a momentum-driven armature of a main dynamo-electric machine having a field-magnet winding, of an auxiliary generating armature adapted to energize said field winding to effect regeneration of said main machine to said supply circuit, a driving armature for said generating armature, separate field windings for said auxiliary armatures energized in accordance with the regenerated current, and shunt field windings for said auxiliary armatures respectively opposing and assisting the corresponding separate field windings.

13. In a system of control, the combination with a supply-circuit, and a momentum-driven armature of a main dynamo-electric machine having a field-magnet winding, of an auxiliary generating armature having a field winding energized independently of supply-circuit-voltage fluctuations and adapted to energize said field winding to effect regeneration of said main machine to said supply circuit, a driving armature for said generating armature, means dependent upon variations of regenerated current for substantially immediately effecting a counteracting change in the excitation of said driving armature and for concurrently effecting a corresponding change in the excitation of the other auxiliary armature.

14. In a system of control, the combination with a supply-circuit, and a momentum-driven armature of a main dynamo-electric machine having a field-magnet winding, of an auxiliary generating armature adapted to energize said field winding to effect regeneration of said main machine to said supply circuit, a driving armature for said generating armature, means dependent upon variations of regenerated current for substantially immediately effecting a counteracting change in the driving armature excitation to oppositely vary the speed of the auxiliary machines and for concurrently effecting a corresponding change in the excitation of the other auxiliary armature to further vary the main field-winding current oppositely to the concurrent change of regenerated current.

15. In a system of control, the combination with a supply-circuit, and a momentum-driven armature of a main dynamo-electric machine having a field-magnet winding, of an auxiliary generating armature adapted to energize said field winding to effect regeneration of said main machine to said supply circuit, a driving armature for said generating armature having an auxiliary field winding energized in accordance with the regenerated current, and means for varying the effect of said auxiliary field winding under predetermined conditions.

16. In a system of control, the combination with a supply-circuit, and a momentum-driven armature of a main dynamo-electric machine having a field-magnet winding, of an auxiliary generating armature connected to energize said field winding, a driving motor for said generating armature, an independent source of energy connected to said driving armature, a plurality of shunt field windings for the respective auxiliary armatures energized from said source, and a plurality of other field windings for said armatures energized in accordance with the regenerated current.

17. In a system of control, the combination with a supply-circuit, and a main dynamo-electric machine having an armature and a field-magnet winding, of an auxiliary generating armature connected to energize said field winding and also connected in circuit with the main armature under accelerating conditions, a driving motor for said generating armature and a storage battery both connected in circuit with the generating armature, whereby the main-machine current at times drives said generating armature as a motor to cause said driving motor to charge said battery.

18. In a system of control, the combination with a supply-circuit, and a main dynamo-electric machine having an armature and a field-magnet winding and adapted for both accelerating and regenerative operation, of an auxiliary generating armature connected in circuit with said field winding, a driving motor for said generating armature, and means for arranging the main field-winding circuits whereby the field-winding receives its entire excitation from the generating armature during one kind of main-machine operation and only a partial excitation thereof during the other kind of main-machine operation.

19. In a system of control, the combination with a supply-circuit, and a main dynamo-electric machine having an armature and a field-magnet winding and adapted for both accelerating and regenerative operation, of an auxiliary generating armature connected in circuit with said field winding, a driving motor for said generating armature, and switching means for connecting the parallel-related generating armature and main field winding in series relation with the main armature during acceleration, and for connecting the generating armature and the main field winding in a separate circuit during regeneration, whereby said generating armature during the accelerating period of the main machine supplies only the difference between the main-field winding current and the main-armature current.

In testimony whereof, I have hereunto subscribed my name this 30th day of Sept., 1918.

RUDOLF E. HELLMUND